Figure 1:
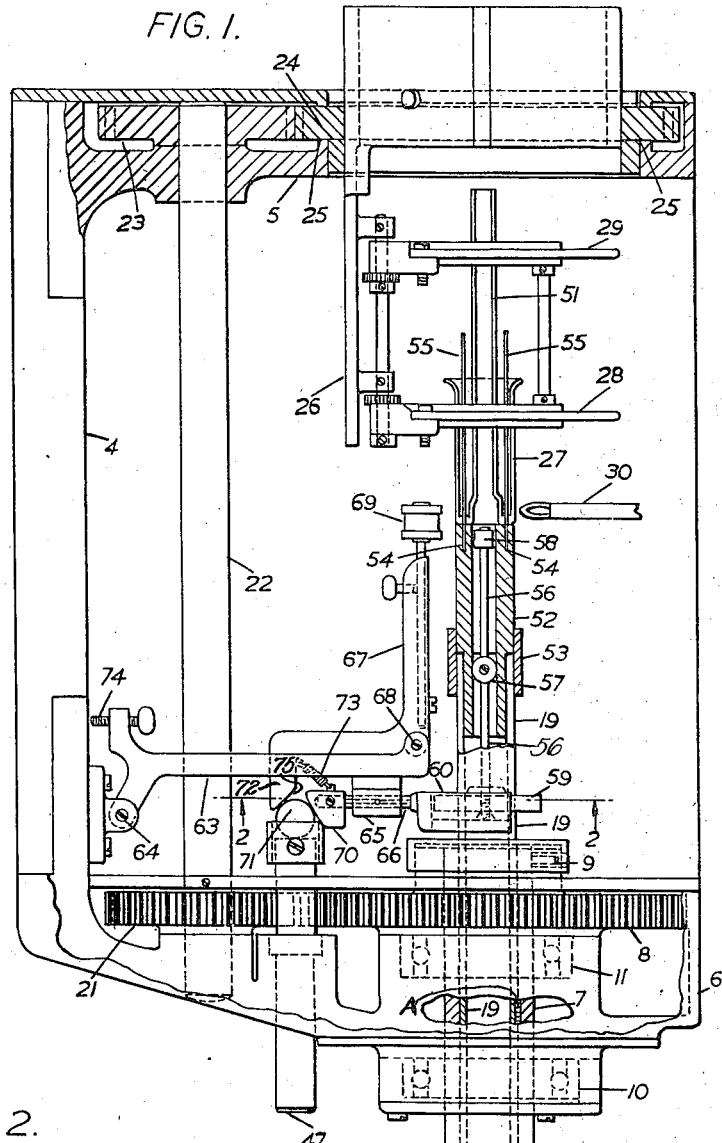

Aug. 24, 1948.  W. R. MOSCRIP  2,447,522
MACHINERY FOR VACUUM TUBE MANUFACTURE
Filed May 9, 1944

Inventor
William Roswell Moscrip
By
Robert Harding Jr.
Attorney

Patented Aug. 24, 1948

2,447,522

UNITED STATES PATENT OFFICE 2,447,522

MACHINERY FOR VACUUM TUBE MANUFACTURE

William Roswell Moscrip, London, England, assignor, by mesne assignments, to International Standard Electric Corporation, New York, N. Y., a corporation of Delaware Application May 9, 1944, Serial No. 534,790 In Great Britain May 21, 1943

12 Claims. (Cl. 49—2)

1

The present invention relates to improvements in machinery for the manufacture of vacuum tubes and the like, and is principally concerned with means for forming circular stems for such tubes and sealing conductor wires through the stems.

One commonly used form of stem for a vacuum tube consists of a relatively wide glass tube flared at one end for sealing to the envelope and joined at the other end by an annular seal to a co-axial exhaust tube of smaller diameter passing through the flared tube. The conductors for the electrodes inside the envelope are sealed through the annular seal and pass out in the space between the two tubes.

It is common practice to manufacture stems for vacuum tubes on a multi-head machine comprising an indexing table on which are mounted a plurality of stem heads in each of which a stem to be formed may be rotated opposite sets of burners for softening the glass. The table is periodically rotated in steps about a vertical axis so as to bring the stem heads successively to position of progressively increasing heating, and/or to position where a forming operation is performed.

The object of the present invention is to simplify and improve the manufacture of circular stems of the kind described by providing the stem head with an automatic tool which joins the two parts of the stem and seals the conductors therethrough in one operation.

While such a tool will be of particular advantage when used in a multi-head indexing machine, it is not confined to this type of machine, but could be employed in a single head machine making only one stem at a time, if desired.

It is to be noted that in the manufacture of circular stems, it is desirable that the heating of the glass should be perfectly even and that the heating flames should not be periodically interrupted by the frame or other moving part of the stem head. For this reason, the stem head should preferably be of the vertical lathe type, and the tool to be described below is therefore adapted to this kind of stem head or lathe.

According to the invention, there is provided an arrangement for forming a circular press from parts of fusible material, comprising a hollow cylindrical member containing a longitudinal rod carrying at one end a forming roller, means for rotating the parts and the member about the same axis, and means operable from outside the hollow member for tilting the rod about a fulcrum so that while the member rotates, the axis of the rod remains fixed in space and inclined to the axis of rotation.

According to another aspect the invention provides an arrangement for sealing together the ends of two tubes of fusible material co-axially arranged one inside the other, comprising a hollow cylindrical die having a flat end arranged in proximity to the ends of the tubes to be sealed, means for rotating the die and tubes about the same axis, heating means for softening the ends of the tubes, and means operable externally to the die during rotation for transferring an internal forming roller from its normal position inside the die into the end of the inner tube, and pressing it into contact with the softened wall thereof.

Figure 2:
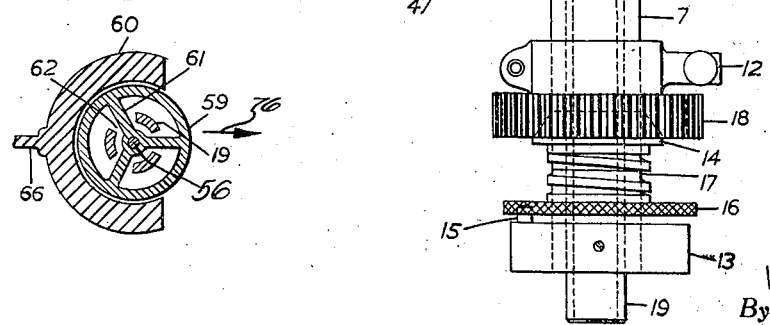

The invention will be described with reference to the accompanying drawings in which:

Fig. 1 shows a side view with certain parts in section of a stem head equipped with a forming arrangement according to the invention; and Fig. 2 shows a partial section view at 2—2 of Fig. 1 to an enlarged scale to show a detail.

Referring to Fig. 1, the stem head lathe comprises a C-shaped frame which may be fixed to an indexing table of any suitable type. The frame has an upright member 4, and upper and lower horizontal members 5 and 6.

The main rotating shaft of the lathe is a tube 7, to the upper end of which is pinned a horizontal gear-wheel 8 by means of the pin 9. The tube runs on main ball bearings 10 and 11, and is caused to rotate by a gear-wheel 18 driven by a main driving wheel (not shown) mounted on the indexing table. The gear-wheel 18 may be solidly fixed to the tube 7, or as shown in Fig. 1, it may be coupled thereto through a friction clutch comprising a cone 14 keyed to the tube 7, and pressed into a conical recess in the gear wheel 18 by a spring 17. The pressure is regulated by a disc 16 on which the spring bears, and which can be screwed up the tube 7, its position being maintained by a pin 15 urged upwards by a spring (not shown) and carried by a collar 13 fixed to the tube 7. The pin 15 enters one of a number of equally spaced holes in the disc 16. A collar 12, also fixed to the tube 7, forms a thrust bearing for the gear-wheel 18. If it should be desired to stop rotation of the work, a stop member (not shown) can be made to engage the projecting portion of the collar 12, thus stopping the main shaft while the clutch slips and allows the gear-wheel 18 to continue its rotation.

A smaller tube 19 fits smoothly inside the tube 7 and is keyed thereto by means shown at A, Fig.

1, which allows it to slide vertically inside the tube 7, while constraining it to rotate therewith. These two tubes can be clearly seen in the sectioned portion at A in Fig. 1.

The gear-wheel 8 drives another gear-wheel 21 fixed to a vertical counter-shaft 22 carrying at the upper end a second gear-wheel 23 similar to 21. The wheel 23 drives a gear-wheel 24 similar to 8 which runs on a horizontal circular bearing 25 of large diameter, and carries a stem holder 26 fixed thereto in an easily removable manner, and adapted to grasp a stem blank 27 and a co-axial exhaust tube 51 by clamps 28 and 29, respectively. The bearing 25 has a circular central clearance hole providing space in which the stem holder may rotate. A fixed burner for heating the stem blank may be placed as shown at 30. A group of similar burners may be used, if desired.

It will be understood that the gear-wheel 24 carrying the holder 26 will rotate synchronously with the gear-wheel 8, so that the stem blank 27 and the tube 51 will rotate at the same speed and will have no relative movement provided the stem blank and tube are properly centred by means of the clamps.

Above the lower horizontal member 6 of the frame is mounted a press-forming arrangement or tool according to the invention. This tool comprises a hollow die 52 fixed co-axially to the upper end of the tube 19 by means of the collar 53. The die has a reduced portion which slips inside the tube 19, and carries at its upper end a number of locating holes 54 into which may be inserted the conductors 55 which have to be sealed through the press.

Inside the die 52 is placed a longitudinal rod 56 carrying a ball 57 which slides snugly inside the central bore of the die and acts as a hinge or fulcrum about which the rod 56 can be tilted in any direction.

The upper end of the rod 56 carries a roller 58 which in the unoperated position of the tool shown is just below the upper surface of the die. The lower end of the rod 56 is fixed to the centre of a wheel 59 held in a crutch 60, the forms of which are seen in the section view of Fig. 2.

This wheel has three spokes 61, and the tube 19 is provided with three equal slots 62 cut longitudinally from the upper end down as far as a point just below the wheel 59. These slots are wide enough to provide relatively large clearance for the spokes of the wheel 59 as indicated in Fig. 2. The crutch 60 provides an appropriate bearing in which the wheel 59 may rotate.

It will be understood that the wheel 59 with the rod 56 attached can be slipped down the tube 19 with the spokes 61 in the slots 62 until the wheel enters the crutch 60, and the hollow die 52 can then be slipped over the rod 56 and ball 57 until it rests on the upper edge of the tube 19, being then held in place by the collar 53. In Fig. 1, the rod 56 can be seen through one of the slots 62.

The main lever 63 is hinged at 64 to the upright member 4 of the frame and carries a bush 65 in which a rod 66 attached to the crutch 60 can slide horizontally. The main lever also carries a vertical lever 67 hinged at 68 and carrying at the upper end a roller 69 which is just opposite the top of the die 52.

The rod 66 carries a cam block 70 which rests upon a ball 71 mounted at the top of a plunger 47. The turned down tail 72 of the vertical lever 67 also rests on the ball 71 on a chamfered edge 75 as shown, and the block 70 and tail 72 are urged together by a spring 73.

Before making the press, the stem 27 and exhaust tube 51 are arranged co-axially close to the top of the die 52, with the conductor wires 55 standing in the holes 54 between the two tubes. The glass is then heated with the die 52 and holder 26 rotating together until sufficiently softened, when the plunger 47 is pushed upwards by suitable means (not shown). The first effect is to raise the main lever 63 together with the crutch 60 and the vertical lever 67. This brings the two rollers just above the top of the die, the wheel 59 rising in the slots 62 and carrying the rod 56 with it. An adjustable stop 74 in the heel of the main lever 63 now comes up against the vertical frame member 4 and prevents the lever 63 from moving further. The plunger 47, however, continues to be pushed upwards and now spreads apart the block 70 and the tail 72 of the lever 67. The crutch 60 is thus moved sideways and carries with it the wheel 59, which, as will be seen from Fig. 2 is able to move a short distance in the direction of the arrow 76 on account of the clearance between the slots 62 and the spokes 61, whatever be the position of the spokes with respect to the crutch. The wheel 59 swings the lever 56 anti-clockwise (Fig. 1) pressing the roller 58 against the lower inside end of the exhaust tube 51. The lever 67 is at the same time rotated clockwise pressing the roller 69 against the lower outside end of the stem 27. The combined effect of the two rollers is to squeeze the molten glass round the conductor wires, sealing the stem 27 to the tube 51, and making a joint looking substantially as shown in Fig. 1. On release of the plunger 47, the parts of the forming tool return to the initial positions shown.

The wheel 59 provides a means by which the rod 56 may be operated from outside the rotating tube 19 in such a manner that the axis of the rod 56 remains substantially fixed in space, making a small angle with the axis of rotation. By shifting the wheel 59 sideways it is constrained to rotate about a point which is not on the axis, and it causes the axis of the rod 56 to be held fixed in space at a small angle with the axis of the die 52 by the crutch 60 and the ball 57. At the same time the rod 56 rotates about its inclined axis because of the rotation of the wheel 59.

It should be added that the wheel 59 is preferably rigidly fixed to the rod 56, in which case it would tilt slightly when the crutch 60 moves to the right. As the movement is small, it would not be difficult to accommodate the tilt. Furthermore, this wheel does not necessarily have three spokes. It could have any number, for example, only one, in which case the greatest freedom of movement would be obtained, but it would perhaps not be very strong mechanically. Clearly, the tube 19 should have the same number of slots as there are spokes in the wheel 59.

It will be understood that although the stem and tube will be most usually made of glass, the same kind of tool could be used with other fusible materials such as quartz, for example. The tool could be adapted for use with any other kind of stem head working on the lathe principle in which the means for rotating the parts are mounted in a fixed frame and provide uninterrupted access to the heating flames.

What is claimed is:
1. In a machine for the manufacture of vac- uum tubes, a circular stem forming device comprising a cylindrical member for supporting the stem, a rod pivotally mounted intermediate its ends in the member and having a forming roller at one end thereof to contact the internal surface of the stem, a wheel secured to said rod and extending outside said cylindrical member, a second forming roller mounted to contact the outer surface of the stem, a pivotal mount for said second forming roller, and means pressing against said wheel and said pivotal mount for forcing said rollers against the outer and internal surfaces of said stem.

2. A device for forming a circular press from parts of fusible material comprising a frame, a support for the parts of fusible material rotatably mounted in said frame, a hollow cylindrical member rotatably mounted in said frame with one end adjacent to said support, a longitudinal rod contained in said member and having a fulcrum therein intermediate its ends, a forming roller located at the end of said rod adjacent to the said one end of said member, rotating means connected to said hollow cylindrical member and to said support for rotating said parts and said cylindrical member about a common axis, a wheel secured to said rod and extending outside said cylindrical member, and means mounted on the frame pressing against said wheel and operable from outside said hollow member for tilting said rod about the fulcrum whereby, while said member and support rotate, the axis of said rod remains fixed in the cylindrical member inclined to the axis of rotation thereof.

3. A device for sealing together the ends of two tubes of fusible material co-axially arranged one inside the other comprising a frame, a support for the tubes rotatably mounted in said frame, a hollow cylindrical die rotatably mounted in said frame, and terminating adjacent to said support for pressing against the ends of the tubes to be sealed, a rod in said die having a forming roller at the end thereof adjacent to said support, means connected to said die and said support for rotating said die and said tubes about a common axis, heating means arranged adjacent to the termination of said die for softening the ends of said tubes, a wheel secured to said rod and extending outside said cylindrical die and means mounted on said frame pressing against said wheel and operable externally to said die during rotation for transferring said internal forming roller from an inoperative position inside said die into the end of the inner tube and pressing it into contact with the softened wall thereof.

4. A device for sealing a tubular glass stem to an inner coaxial glass exhaust tube comprising a frame, a support for the stem and tube rotatably mounted in said frame, a hollow co-axial cylindrical die rotatably mounted in said frame and terminating adjacent to said support for pressing against the ends of the stem and tube to be sealed, a rod in said die having a forming roller at the end thereof adjacent to said support, means connected to said support and said die for rotating said die and said glass stem and tube about a common axis, heating means arranged adjacent to the termination of said die for softening the glass of both said stem and tube, a wheel secured to said rod and extending outside said cylindrical die, means mounted on said frame pressing against said wheel and operable externally to said die during rotation for sliding said roller out of said die into the end of said exhaust tube, an external forming roller movably mounted on said frame adjacent to the termination of said die, and means on the frame connected to said external roller for moving said external roller to a position outside said stem and opposite said internal roller and for moving said external roller towards the softened ends of said rotating glass stem and tube.

5. A device for sealing a tubular glass stem to an inner coaxial glass exhaust tube comprising a frame, a support for the stem and tube rotatably mounted in said frame, a hollow co-axial cylindrical die rotatably mounted in said frame and terminating adjacent to said support for pressing against the ends of the stem and tube to be sealed; a rod in said die having an internal forming roller at the end thereof adjacent to said support, said rod having a fulcrum comprising a ball fixed to said rod and fitting closely inside said die, means connected to said die and support for rotating said die and stem and tube about a common axis, heating means arranged adjacent to the termination of said die for softening the ends of said stem and tube, a wheel secured to said rod and extending outside said die and means mounted on said frame pressing against said wheel and operable externally to said die during rotation for transferring said internal forming roller from an inoperative position inside said die into the end of said inner tube and pressing it into contact with the softened wall thereof and for tilting said rod about its fulcrum to force the internal forming roller against the heated ends of the tubes.

6. A device for sealing together the ends of two tubes of fusible material coaxially arranged one inside the other comprising a frame, a support for the tubes rotatably mounted in said frame, a hollow cylindrical die rotatably mounted in said frame with one end adjacent to said support for pressing against the ends of the tubes to be sealed, a rod in said die having an internal forming roller at the end thereof adjacent to said support, said rod having a fulcrum comprising a ball fixed to said rod intermediate its ends and fitting closely inside said die, means connected to said die and said support for rotating said die and tubes about a common axis, heating means arranged adjacent to the termination of said die for softening the ends of the tubes, an external forming roller having means pivotally mounting it on said frame adjacent to the termination of said die, a wheel secured to said rod and extending outside said cylindrical member, and means mounted on said frame pressing against said wheel and said pivotal mounting means and operable externally to said die during rotation for tilting said rod around said fulcrum for thus transferring said internal forming roller from an inoperative position inside said die into the end of the inner tube and pressing it into contact with the softened wall thereof and for pressing said external forming roller against the outer tube, said wheel being arranged with its axis parallel to the axis of rotation and having at least one spoke, the center of said wheel being connected to the end of said rod remote from that to which said internal forming roller is attached, said means for rotating said die comprising a tubular driving shaft to which said die is coaxially fixed and having at least one slot therein through which said spoke projects.

7. A sealing device according to claim 6, in which said slot is formed so as to provide sufficient clearance for the spoke of said wheel to allow the axis of said wheel to be displaced by a predetermined distance from the axis of rotation thereof.

8. A sealing device according to claim 6, in which said slot is formed so as to provide sufficient clearance for the spoke of said wheel to allow the axis of said wheel to be displaced by a predetermined distance from the axis of rotation thereof, said means for tilting said rod including a crutch in which said wheel is mounted so as to provide an appropriate bearing therefor and surrounding said tubular driving shaft, said crutch being arranged so as to slide in a direction perpendicular to the axis of rotation of said wheel.

9. A sealing device according to claim 6, in which said slot is formed so as to provide sufficient clearance for the spoke of said wheel to allow the axis of said wheel to be displaced by a predetermined distance from the axis of rotation thereof; said means for tilting said rod including a crutch in which said wheel is mounted so as to provide an appropriate bearing therefor and surrounding said tubular driving shaft and being arranged so as to slide in a direction perpendicular to the axis of rotation of said wheel, and a main lever pivoted at a fixed point on the frame and a bush carried thereby in which said crutch may slide, said lever being so positioned that when pivoted about said fixed point through a small angle from a rest position, said wheel is moved parallel to the axis of rotation, thereby moving said internal roller into the end of said inner tube.

10. A sealing device according to claim 6, in which said slot is formed so as to provide sufficient clearance for the spoke of said wheel to allow the axis of said wheel to be displaced by a predetermined distance from the axis of rotation thereof; said means for tilting said rod and for pressing said external roller including a crutch in which said wheel is mounted so as to provide an appropriate bearing therefor and surrounding said tubular driving shaft and being arranged so as to slide in a direction perpendicular to the axis of rotation of said wheel, a main lever pivoted at a fixed point on the frame and a bush carried by said main lever in which said crutch may slide, said lever being so positioned that when pivoted about said fixed point through a small angle from a rest position, said wheel is moved parallel to the axis of rotation, thereby moving said internal roller into the end of said inner tube, and a second lever carrying said external forming roller and pivoted to the end of the main lever, so that when the second lever is pivoted said external roller is moved toward said internal roller.

11. A sealing device according to claim 6, in which said slot is formed so as to provide sufficient clearance for the spoke of said wheel to allow the axis of said wheel to be displaced by a predetermined distance from the axis of rotation thereof; said means for tilting said rod and pressing said external roller including a crutch in which said wheel is mounted so as to provide an appropriate bearing therefor and surrounding said tubular driving shaft and being arranged so as to slide in a direction perpendicular to the axis of the rotation of said wheel, a main lever pivoted at a fixed point on the frame and a bush carried thereby in which said crutch may slide, said lever being so positioned that when pivoted about said fixed point through a small angle from a rest position, said wheel is moved parallel to the axis of rotation, thereby moving said internal roller into the end of said inner tube, a second lever carrying said external forming roller and pivoted to the end of the main lever, so that when the second lever is pivoted said external roller is moved toward said internal roller, a plunger formed and positioned so as to operate said levers, a ball on one end of said plunger, and a pair of cam blocks one attached to said crutch and the other to said second lever and in contact with said ball.

12. A sealing device according to claim 6, in which said slot is formed so as to provide sufficient clearance for the spoke of said wheel to allow the axis of said wheel to be displaced by a predetermined distance from the axis of rotation thereof, said means for tilting said rod and pressing said external roller including a crutch in which said wheel is mounted so as to provide an appropriate bearing therefor and surrounding said tubular driving shaft and being arranged so as to slide in a direction perpendicular to the axis of rotation of said wheel, a main lever pivoted at a fixed point on the frame and a bush carried thereby in which said crutch may slide, said lever being so positioned that when pivoted about said fixed point through a small angle from a rest position, said wheel is moved parallel to the axis of rotation, thereby moving said internal roller into the end of said inner tube, a second lever carrying said external forming roller and pivoted to the end of the main lever, so that when the second lever is pivoted said external roller is moved toward said internal roller, a plunger formed and positioned so as to operate said levers, a ball on one end of said plunger, a pair of cam blocks one attached to said crutch and the other to said second lever and in contact with said ball of the plunger, and an adjustable stop for said main lever bearing against said frame after said main lever has been pivoted through a predetermined angle by said plunger, whereby further operation of said plunger causes said cam blocks to be urged apart by said ball on the plunger, thereby causing tilting of said rod inside said die and also pivoting of said second lever about its pivot so that said two forming rollers approach one another.

WILLIAM ROSWELL MOSCRIP.

REFERENCES CITED

The following references are of record in the file of this patent:

UNITED STATES PATENTS

| Number | Name | Date |
| --- | --- | --- |
| 418,235 | Schulze-Berge | Dec. 31, 1889 |
| 1,006,383 | Johns | Oct. 17, 1911 |
| 1,730,926 | Fitch | Oct. 8, 1929 |
| 1,914,205 | Hooper et al. | June 13, 1933 |
| 2,266,417 | Eisler | Dec. 16, 1941 |

FOREIGN PATENTS

| Number | Country | Date |
| --- | --- | --- |
| 13,609 | Germany | June 9, 1881 |